No. 874,204. PATENTED DEC. 17, 1907.
P. JESS.
VEHICLE BRACE.
APPLICATION FILED JULY 3, 1907.

Witnesses.
Inventor.
Peter Jess.
By James L. Norris
Atty.

UNITED STATES PATENT OFFICE.

PETER JESS, OF SABULA, IOWA.

VEHICLE-BRACE.

No. 874,204.  Specification of Letters Patent.  Patented Dec. 17, 1907.

Application filed July 3, 1907. Serial No. 382,108.

*To all whom it may concern:*

Be it known that I, PETER JESS, a citizen of the United States, residing at Sabula, in the county of Jackson and State of Iowa, have invented new and useful Improvements in Vehicle-Braces, of which the following is a specification.

This invention relates to vehicle braces; and the object thereof is to provide a brace in a manner as hereinafter set forth to prevent a forward movement of the body of the vehicle when the front wheels enter an indentation in the road-bed, thereby overcoming the shifting forward of the load upon the top of the vehicle spring and thus preventing the bending forward of the springs and the loosening of the bolts for securing the springs in position so as to overcome the rattling of such parts of the vehicle and by such arrangement the life of the springs is increased and disagreeable noises obviated.

Further objects of the invention are to provide a vehicle brace which shall be simple in its construction, strong, durable, efficient in its use, overcoming the objections heretofore set forth, readily set up and comparatively inexpensive to manufacture.

With the foregoing and other objects in view, the invention consists in the novel construction, combination and arrangement of parts hereinafter more specifically described and illustrated in the accompanying drawings wherein is shown the preferred embodiment of the invention, but it is to be understood that changes, variations and modifications can be resorted to which come within the scope of the claims hereunto appended.

In describing the invention in detail reference is had to the accompanying drawings wherein like characters denote corresponding parts throughout the several views, and in which—

Figure 1:
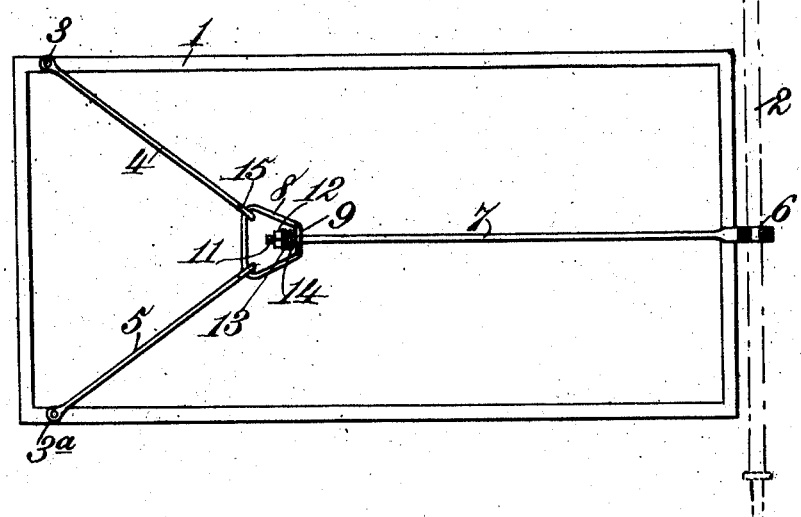
Figure 2:
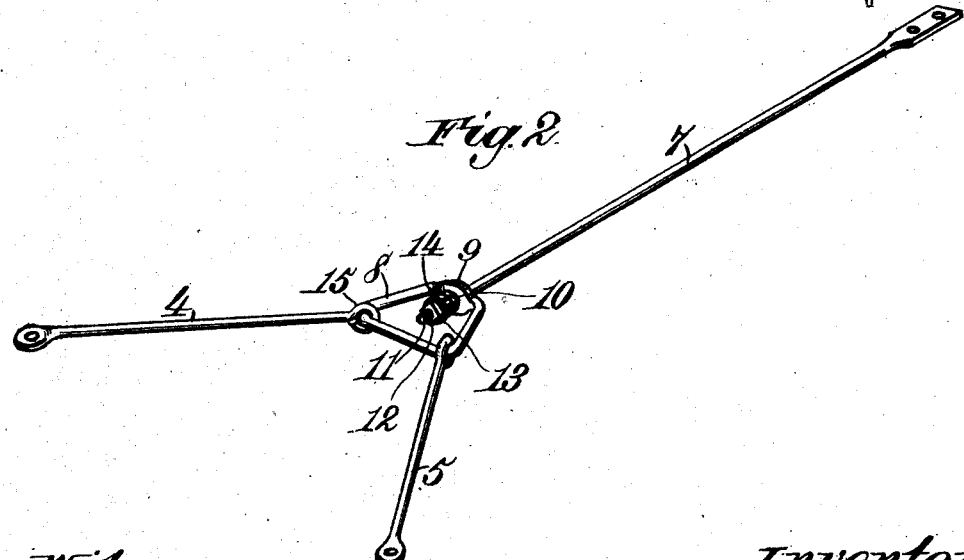

Figure 1 is an inverted plan view of a vehicle body showing the adaptation of a brace thereto in accordance with this invention, and, Fig. 2 is a perspective view of the brace.

Referring to the drawings by reference characters, 1 denotes a vehicle body and 2 the rear axle. Attached to the sides of the vehicle body near the forward end thereof, as at 3, 3ª, are the rods 4, 5, which extend diagonally with the vehicle body and towards each other. Connected to the rear axle 2, as at 6, is a longitudinally-extending bar 7 which is arranged approximately centrally of the lower face of the body 1. Connected to the forward end of the bar 7 and the rear ends of the rods 4, 5 is a link 8 which may be of any suitable shape, but is shown triangular in contour.

The rear end of the link 8 is formed with a flattened portion 9 provided with an opening 10 through which extends the forward end of the bar 7. The forward end of the bar 7 is screw-threaded, as at 11, and carries a nut 12, a washer 13 and a coiled compression spring 14 which is interposed between the washer 13 and the flattened portion 9 of the link 8. The rear end of each of the rods 4, 5 is formed in a hook-like manner, as at 15 and which are connected to the link 8. The bar 7, as well as the rods 4, 5, is loosely connected to the link 8, so that the necessary "play" of the link 8, as well as the rods 4, 5, can be had when occasion so requires.

The brace formed by the rods 4, 5, bar 7 and link 8, holds the body portion of the vehicle in position so as to prevent forward movement thereof, but it allows for a downward movement of the springs of the vehicle and at the same time prevents the shifting forward of the weight of the load. This is evident owing to the bar 7 being connected to the rear axle 2 and the rods 4, 5 to the body. If the body tends to move forward the bar 7 will arrest such movement, but the body can have a downward movement owing to the loose connection between the rods 4, 5 and the link 8.

The compression spring 14 acts as a cushion between the link 8 and the bar 7 during the downward movement of the vehicle body and when the body rises the spring 14 tends to cause the link to resume its normal position upon the bar 7.

What I claim is—

1. A vehicle brace for the purpose set forth comprising a link, a longitudinally-extending bar adapted to have the rear end connected to the rear axle and its forward end loosely connected to the rear end of the link, and a pair of diagonally-extending rods adapted to have the forward ends thereof connected to the forward portion of the vehicle body and the rear ends loosely connected to the forward portion of the link.

2. A vehicle brace for the purpose set forth, comprising a link, a pair of rods having the forward ends thereof connected to the forward part of the vehicle body and their rear ends loosely connected to said link, and an elongated longitudinally-extending bar having the rear end thereof adapted to be connected to the rear axle of the vehicle and the forward end loosely connected to said link.

3. A vehicle brace for the purpose set forth comprising a link, a pair of rods adapted to have the forward ends thereof connected to the sides of the vehicle body forwardly thereof and their rear ends loosely connected to said link, an elongated longitudinally-extending rod arranged centrally of the vehicle body and adapted to have the rear end thereof connected to the rear axle of the vehicle and the forward end thereof extend in said link, a nut carried by the forward end of said bar, and a spring interposed between the nut and the link.

4. A vehicle brace for the purpose set forth embodying a pair of diagonally-extending rods adapted to have their forward ends connected to the vehicle body forwardly thereof, a longitudinally-extending slidable bar adapted to have the rear end connected with the rear axle of the vehicle, and means for pivotally connecting said rods to said bar.

5. A vehicle brace comprising a pair of diagonally-extending rods, a longitudinally-extending slidable bar, and means for pivotally connecting the rear end of each of the rods with the bar.

In testimony whereof I have hereunto set my hand in presence of two subscribing witnesses.

PETER JESS.

Witnesses:
 JOHN KUHL,
 D. G. WHITNEY.